Jan. 11, 1927.

C. J. COBERLY 1,613,743

PRESSURE REGULATOR

Filed July 8, 1925

INVENTOR:
CLARENCE J. COBERLY,
BY
ATTORNEY.

Jan. 11, 1927.          C. J. COBERLY          1,613,743
                     PRESSURE REGULATOR
                    Filed July 8, 1925          2 Sheets-Sheet 2
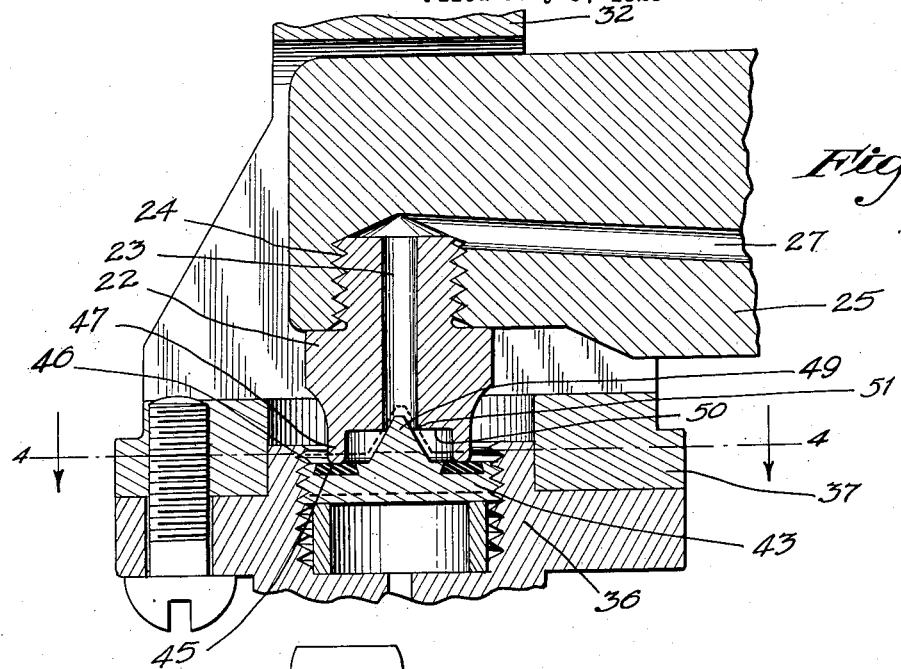
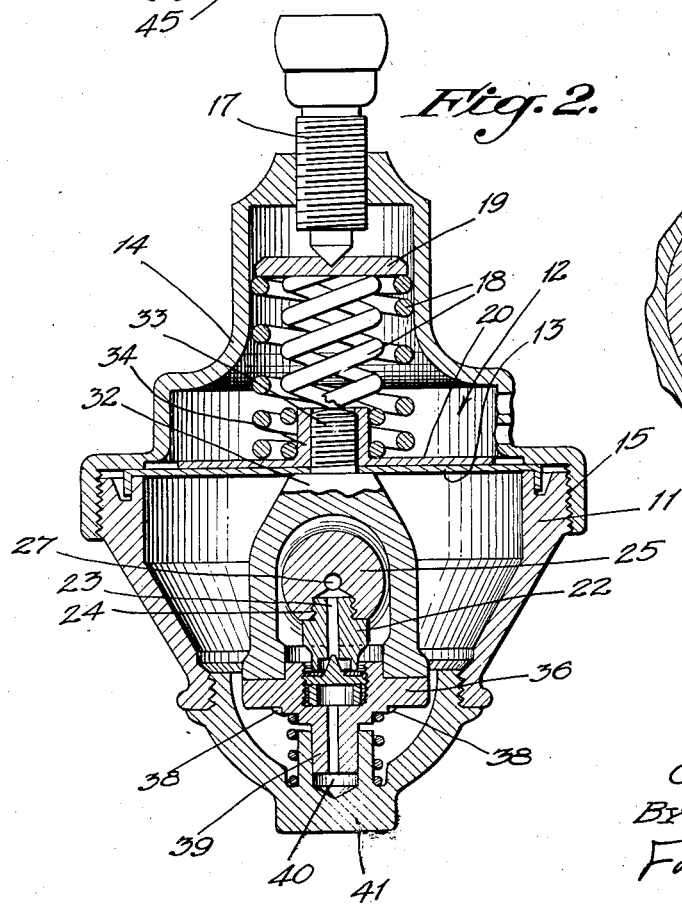
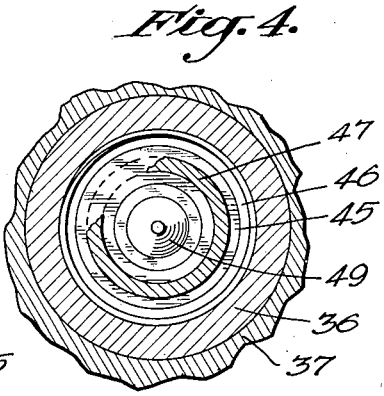
INVENTOR:
CLARENCE J. COBERLY,
BY
Fred W. Davis
ATTORNEY.

Patented Jan. 11, 1927.

1,613,743

UNITED STATES PATENT OFFICE.

CLARENCE J. COBERLY, OF LOS ANGELES, CALIFORNIA, ASSIGNOR TO PUROX COMPANY, OF DENVER, COLORADO, A CORPORATION OF COLORADO.

PRESSURE REGULATOR.

Application filed July 8, 1925. Serial No. 42,209.

This invention relates to regulators for controlling and reducing the pressure of gases prior to use, and it particularly relates to a pressure regulator of this character which is valuable for regulating the pressure of combustible gases. My invention is of marked value in the art of oxyacetylene welding.

For reducing the oxygen pressure from an exceedingly high pressure in a container to a pressure suitable for torch utilization, a regulator of the character of my invention is used. The present regulators generally are provided in the form of a body having a cavity therein which is closed by a diaphragm, this diaphragm being secured in place by a suitable cover. The cavity has an inlet opening and an outlet opening, the inlet opening being connected with the oxygen container and the outlet opening being connected with a torch. A nozzle is secured to the body inside the cavity, having a passage therethrough which is in communication with the inlet opening of the body. A closure member, carried by a yoke secured to the diaphragm, is positioned so as to close the passage in the nozzle when the pressure in the cavity is sufficient to force the diaphragm outwardly against the action of adjustment springs. These adjustment springs are set so that the diaphragm will move to bring the seat into engagement with the nozzle, stopping a flow of oxygen into the cavity when the pressure in said cavity reaches a certain point.

The closures of these regulators are made from a combustible material because no noncombustible material suitable for this use has been discovered. It sometimes occurs that the closure member is ignited and burned away. This results in a violent rush of oxygen into the cavity, causing an enormous sudden pressure which results generally in considerable damage to the generator.

It is an object of my invention to provide an auxiliary valve which will close the inlet to the cavity in event the main closure becomes ineffective. My invention prevents a sudden rush of gas and violent pressures in the cavity when the seat burns away as occurs in the present regulators. The action of my invention, therefore, prevents a damaging of the regulator, it being only necessary to replace the destroyed closure.

Other objects and advantages of my invention will appear in the following description.

Referring to the drawing in which I illustrate a preferred embodiment of my invention, Fig. 1 is an elevational view partially sectioned through a regulator embodying the features of my invention.

Fig. 2 is a section taken on the line 2—2 of Fig. 1.

Fig. 3 is an enlarged fragmentary view clearly illustrating the auxiliary protection valve of my invention.

Fig. 4 is a section taken on the line 4—4 of Fig. 3.

In the drawing I show a regulator comprising a body 11 having a cavity 12 which has the upper end thereof closed by a diaphragm 13, thereby providing a pressure chamber. The diaphragm 13 is secured in place to tightly close the cavity 12 by means of a cover or cap 14 which is threadably secured to the body 11 at 15. Threadably secured to the cap 14 is an adjustment screw 17 which compresses springs 18 between a washer 19 and a flange 20 of the diaphragm 13. The springs 18 exert a pressure against the diaphragm 13 to oppose a gas pressure inside the cavity 12, as will be explained later.

A nozzle 22 having a passage 23 therethrough is threadably secured at 24 to an arm 25 of the body 11, which arm extends into the cavity 12, as shown. The passage 23 is connected with an inlet opening 27 which extends through a projection 28 of the body 11 and the arm 25 of the body 11. A suitable attachment arrangement 30 is secured to the outer end of the projection 28, as shown clearly in Fig. 1.

A yoke 32 is carried in the cavity 12 by means of a threaded pin 33 which threads into a hub portion 34 of the flange 20 of the diaphragm 13. A plate 36 is secured to a lower horizontally extending part 37 of the yoke 32 by suitable screws 38. The plate 36 has a cylindrical centralizing projection 39 extending into a recess 40 of a cover 41. The cover 41 is removably secured to the body 11 and allows a removal of the plate 36 without disassembling other parts of the regulator.

The plate 36 carries a closure member 43 which is threadably secured thereto below the lower end of the nozzle 22. The closure member 43 has an annular seat 45 which is imbedded in an upper face 46 thereof. This seat 45 in accordance with present practice is made from a combustible material such as hard rubber. Formed at the lower end of the nozzle 22 surrounding the lower end of the passage 23 is a valve portion 47, this valve portion 47 being rounded at the end and adapted for engagement with the seat 45 to close the passage 23 when the pressure in the cavity 12 reaches a certain point which is predetermined by an adjustment of the screw 17 which controls the pressure of the springs 18 against the diaphragm 13.

An auxiliary valve in the form of a central cone or member 49 extends upwardly from the face 46 of the closure member 43 substantially concentric with respect to the passage 23 in the nozzle 22. The lower end of the nozzle 22 is provided with an annular shoulder 50 which presents an annular corner 51 at the lower end of the passage 23 adjacent to the cone 49.

The operation of the regulator is substantially as follows:

Compressed gas under high pressure is introduced to the regulator through the inlet 27, the gas passing through the passage 23 and into the cavity or chamber 12. The adjustment screw 17 has been previously regulated so that a certain pressure is exerted against the diaphragm 13 by the springs 18. When the gas pressure in the chamber 12 increases and exerts a force against the diaphragm 13 substantially equal to the force of the springs 18, the diaphragm 13 will move upward. This moves the yoke 32 therewith and brings the seat 45 into adjacency with the valve portion 47 of the nozzle 22. If the gas is taken from the chamber 12 through an outlet 54 in a substantial flow, the seat 45 and the valve portion 47 will not engage. However, if the outlet is closed or the flow therethrough restrained, the pressure in the chamber 12 will build up in excess of the pressure of the spring 18 and force the diaphragm upward, thus engaging the seat 45 and the valve portion 47. This results in a closing of the passage 23 and prevents the pressure in the chamber 12 from increasing. When gas is again taken from the chamber 12 and the pressure therein reduced, the diaphragm will move down, disengaging the seat 45 and valve 47 and allowing compressed gas to again flow thereinto.

By inspection of Fig. 3 which shows the seat and valve contracted, it will be seen that the cone 49 and the corner 51 of the shoulder 50 are out of engagement by a small distance. In event that the combustible seat 45 ignites or in some manner becomes destroyed, the yoke 32 will be allowed to move upwardly until the member 49 engages the corner 51, this closing the passage 23. It is obvious that when the seat 45 burns away, there will be no sudden rush of gas under high pressure into the chamber 12 by virtue of the auxiliary valve of my invention, the cone 49 engaging the corner 51 and closing the passage 23.

It is very desirable to have the combustible seat 45 placed on the down stream side of the inlet passage of the compressed gas so that it will be blown away from the passage 23 formed through the nozzle 22 in event that it becomes burned and will therefore not clog up the regulator.

It is further desirable to have the combustible seat 45 of small volume so that in case the seat ignites there will be only a small amount of combustion and none of the parts of the gage will be destroyed by heat.

A regulator of my invention is entirely protected against damage due to a burning away of the seat 45. This eliminates considerable expense as the cost of repairing regulators which have been damaged by great pressures in the chamber sometimes equals half the cost of the regulator. In my invention it is only necessary to replace the closure member 43 which is easily and quickly accomplished by removing the cover 41 which gives access to the plate 36.

I claim as my invention:

1. In a pressure regulator, the combination of: an inlet nozzle, said nozzle having an inlet passage; a seat adapted to engage said nozzle in order to close said inlet passage; and means between said seat and said passage for closing said passage when said seat becomes ineffective.

2. In a pressure regulator, the combination of: an inlet nozzle, said nozzle having an inlet passage; a movable seat adapted to engage said nozzle in order to close said inlet passage; and means between said seat and said passage for closing said passage when said seat becomes ineffective.

3. In a pressure regulator, the combination of: a nozzle having a passage and a valve portion formed around one end of said passage; a seat adapted to contact said valve portion to close said passage; and means between said seat and said passage for closing said passage when said seat becomes ineffective.

4. In a pressure regulator, the combination of: a nozzle having a passage extending therethrough; means for closing said passage; and auxiliary means between said means and said passage for closing said passage when said means becomes ineffective.

5. In a pressure regulator, the combination of: a nozzle having a passage extending therethrough; means for closing said passage, said means comprising a valve portion formed around one end of said passage, and a seat arranged for engaging said valve portion; and auxiliary means between said means and said passage for closing said passage when said means becomes ineffective.

6. In a pressure regulator, the combination of: a nozzle having a passage extending therethrough; means for closing said passage, said means comprising a valve portion formed around one end of said passage, and a deteriorable seat arranged for engaging said valve portion; and auxiliary means between said means and said passage for closing said passage when said means becomes ineffective.

7. In a pressure regulator, the combination of: a nozzle having a passage extending therethrough; means for closing said passage, said means comprising a valve portion formed around one end of said passage, and a seat arranged for engaging said valve portion; and auxiliary means for closing said passage when said means becomes ineffective, said auxiliary means comprising a shoulder formed around one end of said passage, and a member inside said seat adapted to engage said shoulder closing said passage.

8. In a pressure regulator, the combination of: a nozzle having a passage extending therethrough; means for closing said passage, said means comprising a valve portion formed around one end of said passage, and a deteriorable seat arranged for engaging said valve portion; and auxiliary means for closing said passage when said means becomes ineffective, said auxiliary means comprising a shoulder formed around one end of said passage inside said valve portion, and a member adapted to engage said shoulder closing said passage.

9. In a pressure regulator, the combination of: a body, said body comprising a cavity, an inlet for said cavity, and an outlet for said cavity; a diaphragm closing said cavity, thus forming a chamber; a nozzle secured to said body inside said chamber, said nozzle having a passage in communication with said inlet; a yoke carried by said diaphragm inside said chamber; a valve portion formed on said nozzle around one end of said passage; a seat carried by said yoke, said yoke being movable to engage said valve portion and said seat, thus closing said passage; a shoulder formed on said nozzle around one end of said passage inside said valve portion; and a member adapted to engage said shoulder closing said passage when said seat becomes ineffective.

In testimony whereof, I have hereunto set my hand at Los Angeles, California, this 2nd day of July 1925.

CLARENCE J. COBERLY.